US006496387B2

(12) United States Patent
Halberstadt

(10) Patent No.: US 6,496,387 B2
(45) Date of Patent: Dec. 17, 2002

(54) RESONANT CONVERTER COMPRISING A CONTROL CIRCUIT

(75) Inventor: Johan Christiaan Halberstadt, Nijmegen (NL)

(73) Assignee: Koninklijke Phillips Electronics N.V., Eindhoven (NL)

(*) Notice: Subject to any disclaimer, the term of this patent is extended or adjusted under 35 U.S.C. 154(b) by 0 days.

(21) Appl. No.: 09/828,106

(22) Filed: Apr. 6, 2001

(65) Prior Publication Data

US 2001/0036090 A1 Nov. 1, 2001

(30) Foreign Application Priority Data

Apr. 10, 2000 (EP) ........................................... 00201281

(51) Int. Cl.[7] .......................... H02M 3/335; H02M 1/12
(52) U.S. Cl. ........................................... 363/17; 363/49
(58) Field of Search ............................... 363/21.02, 16, 363/17, 20, 56, 95, 97, 132, 49

(56) References Cited

U.S. PATENT DOCUMENTS 4,872,100 A * 10/1989 Diaz .......................... 363/141
4,952,849 A * 8/1990 Fellows et al. ............. 315/307
5,075,599 A 12/1991 Overgoor et al. ........... 315/224
5,612,860 A * 3/1997 Meszlenyi ................... 363/49
5,696,431 A 12/1997 Giannopoulos et al. ..... 315/308
5,914,569 A * 6/1999 Bildgen .................. 315/209 R
6,154,375 A * 11/2000 Majid et al. .................. 363/16

FOREIGN PATENT DOCUMENTS

WO 8910679 A1 11/1989
WO 0040058 A1 7/2000

* cited by examiner

*Primary Examiner*—Rajnikant B. Patel
(74) *Attorney, Agent, or Firm*—Aaron Waxler

(57) ABSTRACT

The invention relates to an energy converter for supplying electric energy from an energy source to a load. The converter comprises a transformer having a primary side and a secondary side, the secondary side being adapted to be connected to the load. At least a first and a second controllable switch are arranged in series with each other. The energy converter further comprises a control device for generating control signals with which the first and the second switch are opened and closed for generating an alternating current in the primary side of the transformer, the control device comprising with means for comparing a threshold value with the value of a quantity which relates or is equal to the value of a change of the voltage per unit of time at a node of the first switch and the second switch for determining switching instants of the first and the second switch. The control device is adapted to determine a reached maximum value of said quantity and to determine the threshold value on the basis of the determined maximum value of the quantity. As a result, delay of the comparator may be compensated, while in the near-capacitive mode switching can take place with minimal switching losses.

10 Claims, 5 Drawing Sheets

RESONANT CONVERTER COMPRISING A CONTROL CIRCUIT

The invention relates to an energy converter for supplying electric energy from an energy source to a load, the energy converter comprising a transformer having a primary side and a secondary side, the secondary side being adapted to be connected, in operation, to the load, at least a first and a second series-arranged, controllable switch to be connected, in operation, to the energy source, diodes arranged anti-parallel to the first and the second switch, and comprising a control device for generating control signals with which the first and the second switch are opened and closed for generating an alternating current in the primary side of the transformer, the control device comprising means for comparing a threshold value with the value of a quantity which is related or equal to a change of the voltage per unit of time at a node of the first switch and the second switch for determining switching instants of the first and the second switch.

An energy converter of this type is known per se from, inter alia, U.S. Pat. No. 5,075,599 and U.S. Pat. No. 5,696,431. In this converter, the load is often a rectifier and the energy source is a DC voltage source. Together with the load, the energy converter has for its object to convert a DC input voltage of the energy source into a DC output voltage of the load. However, the load may also comprise a different device than the rectifier, which device is fed with an alternating voltage. The energy converter may thus consist, inter alia, of a DC/DC converter and a DC/AC converter.

For a satisfactory operation of the energy converter, it is important that the switches for generating the alternating current are switched on and off at the right instant. The frequency at which the switches are switched on and off defines the mode of operation of the converter. If the frequency is sufficiently high, the energy converter operates in a regular inductive mode. In this mode, the phase of the current through the primary side of the transformer trails the phase of the voltage at the node. After a current-conducting switch is opened, and after the diode of the other switch has started to conduct the current, the other switch can be opened. In that case, there are no switching losses. The time interval in which both switches are opened is referred to as the non-overlap time.

The converter operates in the near-capacitive mode when the switching frequency of the switches, and hence the frequency of the alternating current through the primary side of the transformer is decreased to a point where the alternating current is at least almost in phase with the alternating current at the node. After the current conducting switch is opened and before the diode, which is arranged anti-parallel to the other switch, starts to conduct, the direction of the current through the primary side of the transformer is reversed. Hard-switching takes place if the other switch is closed in that case. This means that switching takes place at an instant when there is a voltage difference across the relevant switch. This will result in switching losses.

The converter operates in the capacitive mode when the frequency at which the switches are switched is further decreased to a point where the alternating current through the primary side of the transformer is in phase with, or even leads the phase of the voltage at the node. The switching losses also occur in this mode.

Generally, it is desirable that the energy converter operates in the inductive mode. To this end, it is important that the non-overlap time is chosen to be sufficiently long to prevent hard-switching, i.e. switching losses. However, the non-overlap time is bound to a maximum because hard-switching also occurs in the case of a too long overlap time so that switching losses occur.

To determine the overlap time for an energy converter operating in the inductive mode, it is known to provide the control device with means for comparing the value of a quantity which relates or is equal to the value of a change of the voltage per unit of time at a node of the first and the second switch, on the one hand, with a threshold value, on the other hand, for determining the switching instants of the first and the second switch. More particularly, the instant when the other switch must be closed, is determined by measuring the current flowing through a capacitance of the energy converter, which capacitance is incorporated in the energy converter in such a way that it reduces the value of the change of the voltage at the node per unit of time. The other switch is closed at the instant when the value of this current decreases and becomes equal to a relatively small positive threshold value. In accordance with a practical elaboration, the switching instant is determined by comparing the voltage across the current-sense resistor with a reference voltage by means of a comparator. This sense resistor may be arranged in series with said capacitance, or it may be incorporated in the alternating current path via a capacitive current divider. A drawback of the known energy converter is that the comparator, which is operative on the basis of relatively small input signals and relatively small slopes, can react in a delayed manner. As a result, the relevant switches may be switched on too late. This in turn may mean that hard-switching as yet occurs in the inductive mode, resulting in switching losses.

It is an object of the invention to provide a solution to the above-mentioned problem. It is also an object of the invention to provide an energy converter which, when operative in the near-capacitive mode, can reduce the switching losses to a minimum.

According to the invention, the energy converter is characterized in that the control device is adapted to determine a reached maximum value of said quantity and to determine the threshold value on the basis of the determined maximum value of the quantity. Since the threshold voltage is determined on the basis of a determined maximum value of said quantity, it is possible to compensate for said delay and for a comparator possibly used in the control device.

The threshold value can be particularly chosen on the basis of the maximum value in such a way that, when the energy converter operates in the near-capacitive mode, the relevant switch is closed when the alternating voltage at the node has reached an extreme value. This extreme value results in the switching losses being minimized. The reason is that the voltage difference across the switch which is closed at that instant is minimal.

Particularly, the threshold voltage is equal to a factor K times the maximum value, in which K has a value of between 0 and 1. This factor K may be particularly chosen to be such that the switching losses are minimal in the near-capacitive mode. In the inductive mode, it then holds that the overlap time has such a non-critical value that there will be no switching losses at all.

It is therefore preferable that the factor K is determined in such a way that one of the switching instants coincides with the instant when the voltage at the node assumes an extreme value when the frequency of the alternating current through the primary side of the transformer is so low that this alternating current is at least substantially in phase with the voltage at the node. The factor K is thus determined in such a way that the switching losses are minimal in the near-capacitive mode.

The energy converter preferably also comprises at least a capacitance for limiting the value of a change of the voltage at the node per unit of time, the value of said quantity relating to the value of the current through the capacitance. If this capacitance is not present, the voltage at the node per unit of time will have a very large change and will be dependent on parasitic capacitances. If the semiconductor switches do not have large parasitic capacitances, it is therefore advantageous to include the capacitance for limiting the value of the change of the voltage at the node per unit of time. This will often be the case in practice.

In the latter case, it particularly holds that the factor K is determined in such a way that one of the switching instants coincides with the instant when the current through the capacitance becomes zero, while the value of the current preceding said instant decreases to zero when the frequency of the alternating current through the primary side of the transformer is so low that this alternating current is at least substantially in phase with the voltage at the node. The control device may then comprise a current peak detector which is connected via a first measuring capacitance to the node for determining said maximum value.

In accordance with a further elaboration of this variant, the control device further comprises a multiplier which is connected to an output of the peak detector for multiplying the maximum value by the factor K, a second measuring capacitance and a comparator which is connected to an output of the multiplier and is connected to the node via the second measuring capacitance, the comparator being adapted to determine the instant when an output signal of the peak detector is equal to an output signal of the comparator.

Generally, the first and the second capacitance are formed by at least one and the same capacitance in this case.

These and other aspects are apparent from and will be elucidated with reference to the embodiments described hereinafter.

Figure 1:
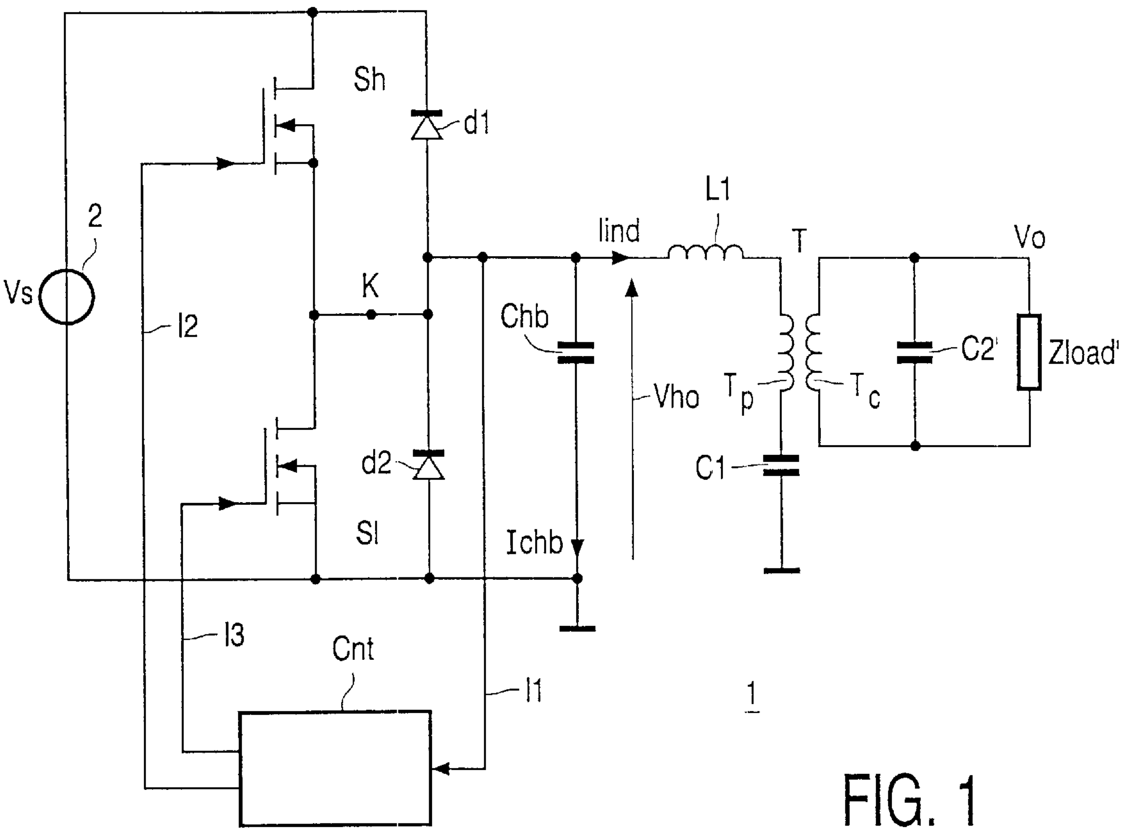
FIG. 1 shows a possible embodiment of an energy converter.
Figure 2:
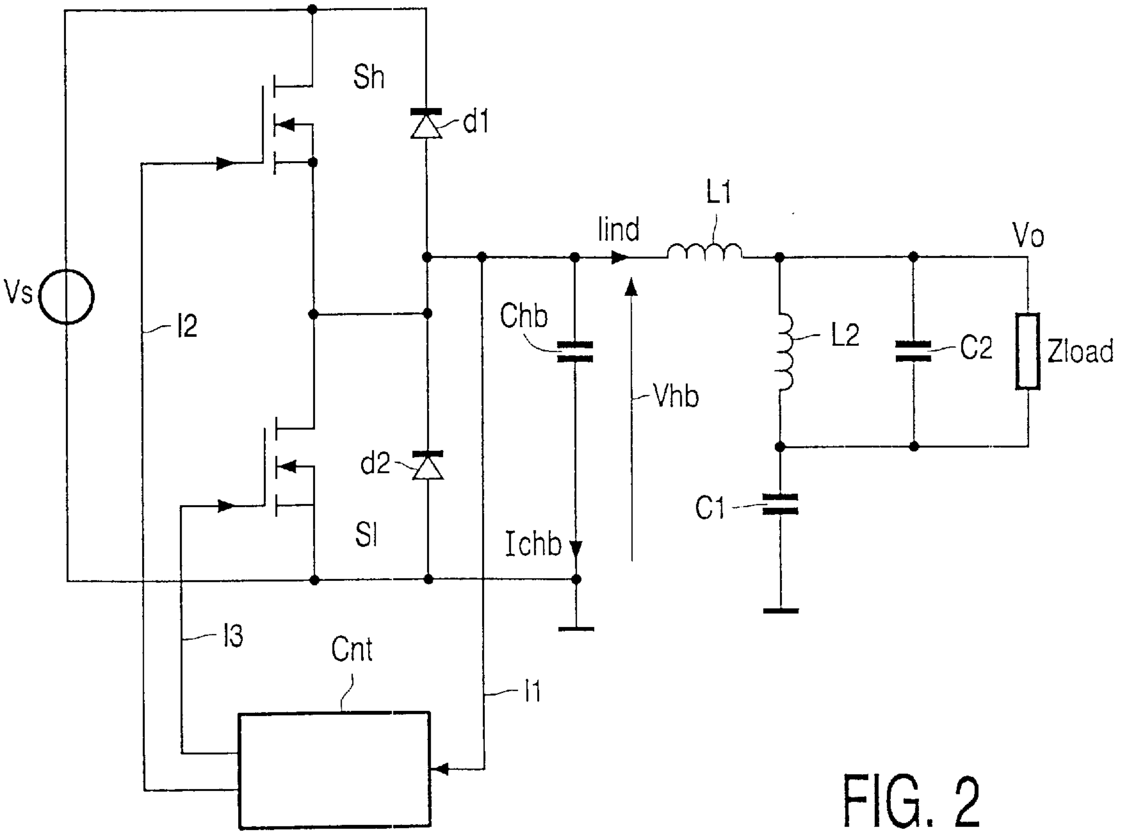
FIG. 2 is a circuit diagram of the energy converter shown in FIG. 1, in which components located on a secondary side of the transformer of the energy converter are transformed to a primary side of the transformer.
Figure 3A:
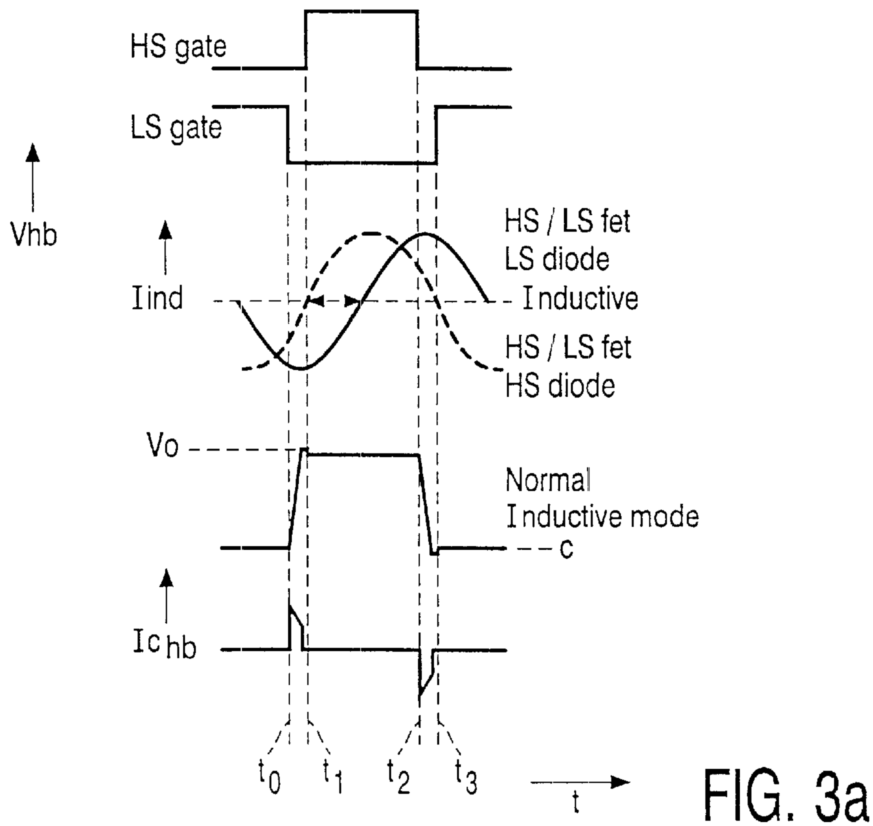
Figure 3B:
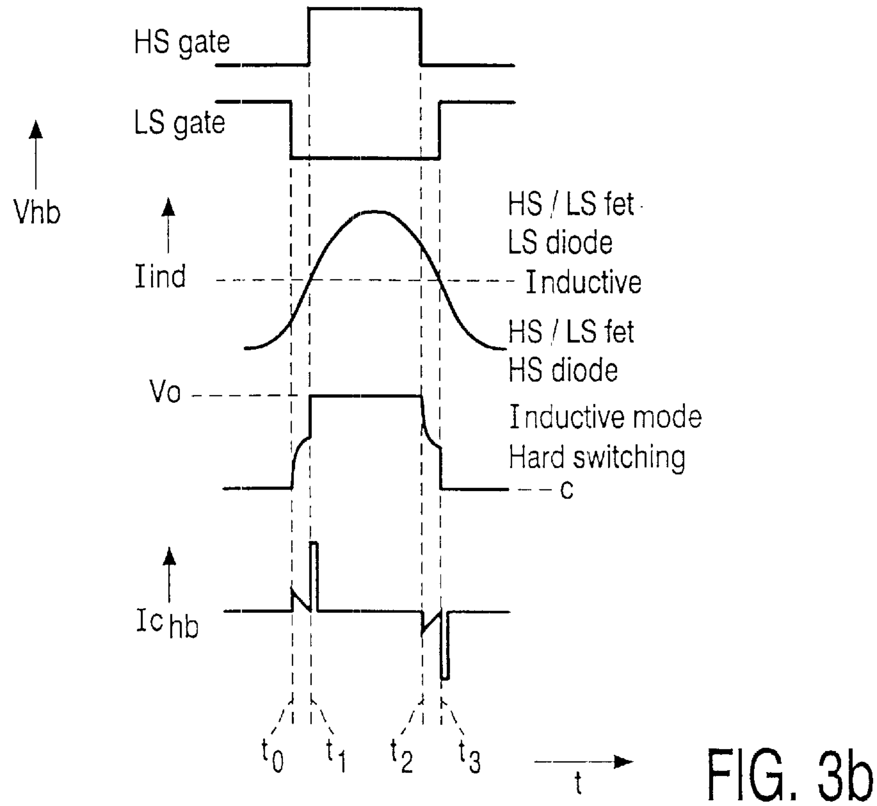
Figure 3C:
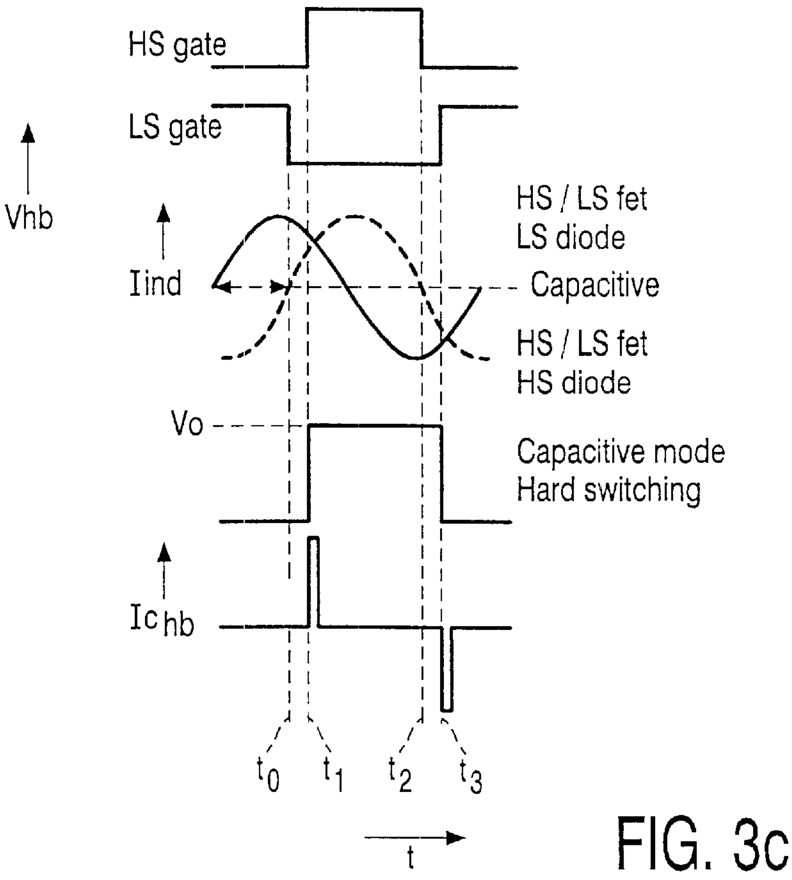
Figure 4A:
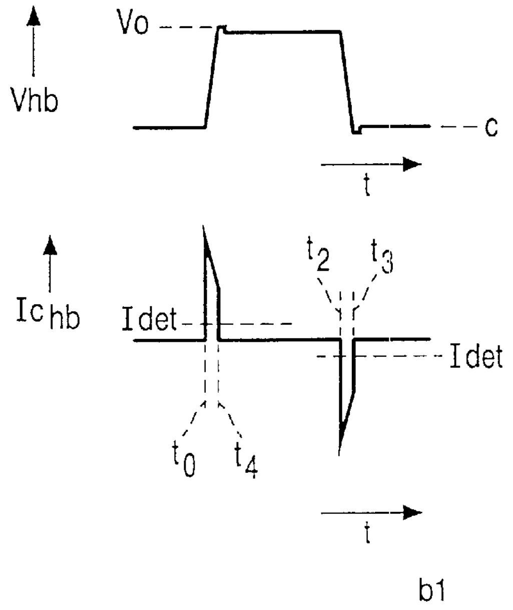
Figure 4B:
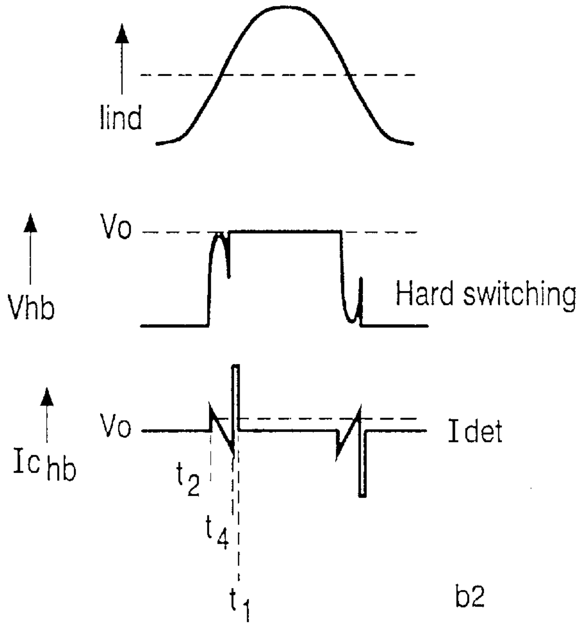
Figure 5:
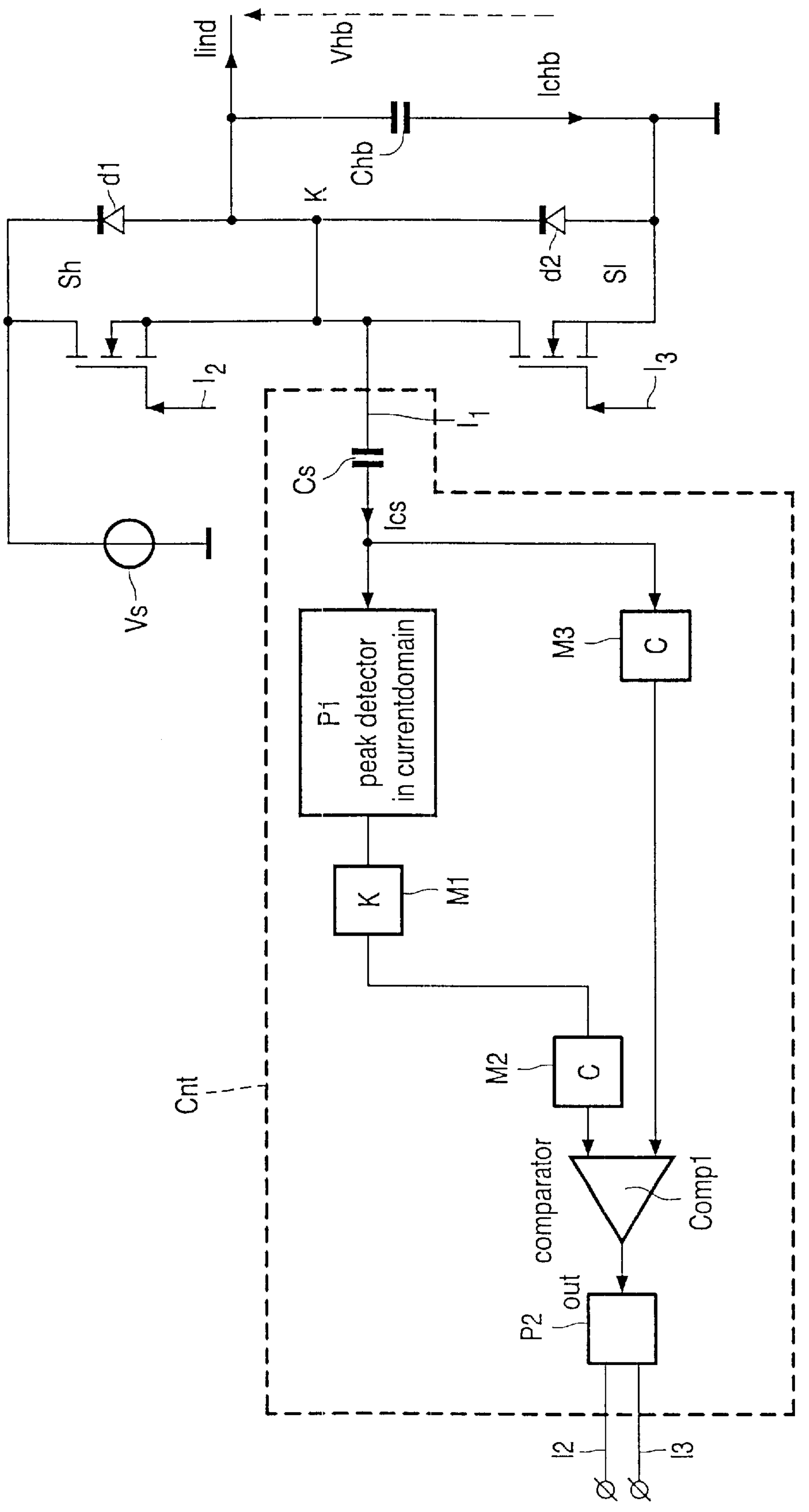
Figure 6A:
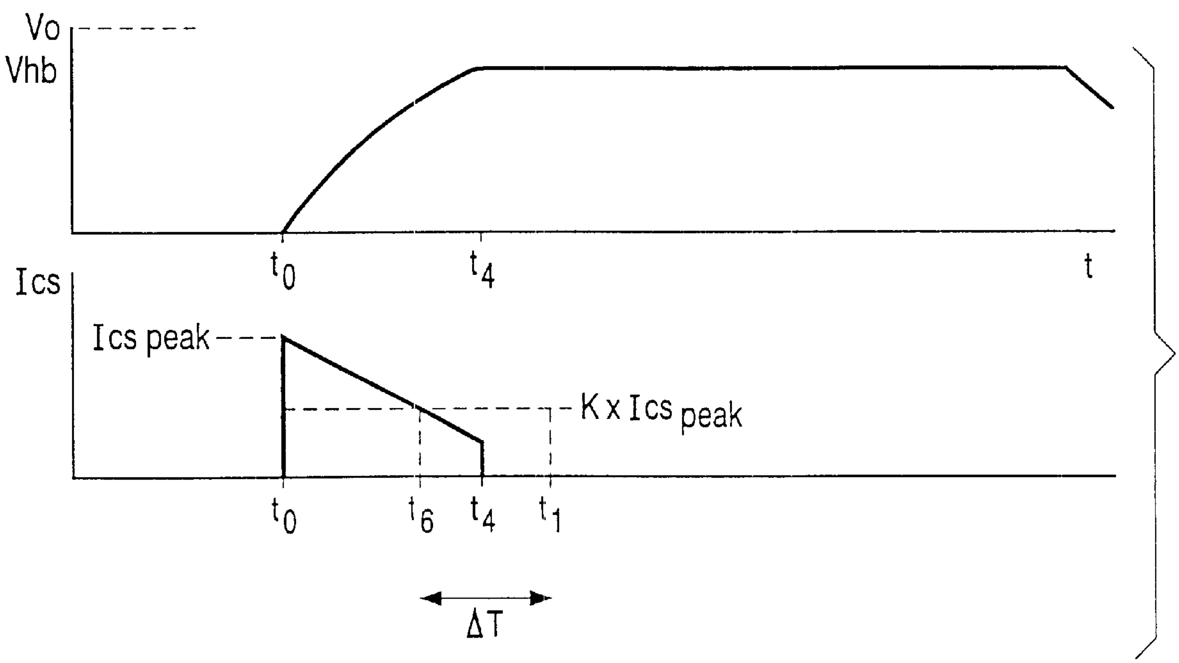
Figure 6B:
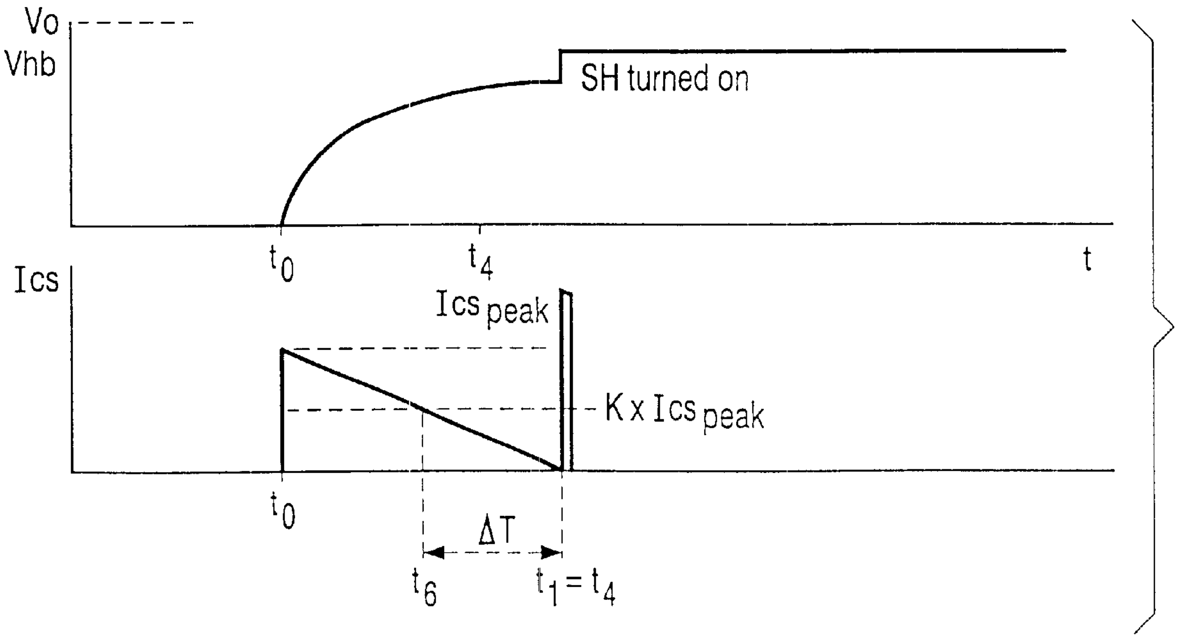

FIG. 3*a* shows various voltages and currents of the energy converter according to FIG. 1, when this converter is active in the inductive mode;

FIG. 3*b* shows various voltages and currents of the energy converter shown in FIG. 1, when this converter is operative in the near-capacitive mode;

FIG. 3*c* shows various voltages and currents of the energy converter shown in FIG. 1, when this converter is operative in the capacitive mode;

FIG. 4*b*1 shows a known method of determining a non-overlap time;

FIG. 4*b*2 shows a known method in accordance with FIG. 4*b*1 which nevertheless leads to hard-switching;

FIG. 5 shows a possible embodiment of a part of the control device of an energy converter according to the invention;

FIG. 6*a* shows a voltage and current diagram to illustrate the operation of the control device of FIG. 5 in the inductive mode; and FIG. 6*b* shows voltages and currents in accordance with FIG. 6*a* for illustrating the control device of FIG. 5 when the energy converter is active in the near-capacitive mode.

The reference numeral 1 in FIG. 1 denotes a possible embodiment of an energy converter. This energy converter may be in the form of an energy converter in accordance with the state of the art and as an energy converter according to the invention. The energy converter as active in accordance with the state of the art will be discussed first.

In this embodiment, the energy converter 1 is formed as a resonant half-bridge converter. The energy converter 1 is adapted to supply electric energy to a load Zload' from an energy source Vs, a DC energy source in this embodiment. In this embodiment, the energy source Vs generates a DC voltage Vo. The energy converter comprises a transformer T having a primary side Tp and a secondary side Tc. Moreover, the energy converter comprises a first controllable semiconductor switch Sh and a second controllable semiconductor switch Sl which are arranged in series with each other. The first switch Sh and the second switch Sl are interconnected at a node K. The first and second semiconductor switches Sh and Sl may be, for example, a transistor, a thyristor, a MOSFET, etc. The first switch Sh is arranged anti-parallel to a body diode d1. The second switch S1 is arranged anti-parallel to a body diode d2. The node K is connected via a coil L1 to the primary side Tp of the transformer T. The energy converter further comprises a capacitance C1, with the coil L1, the primary side Tp and the capacitance C1 being arranged in series with one another. In this embodiment, the capacitance C1 is arranged between the primary side Tp of the transformer T and ground. In this embodiment, one side of the power supply source Vs is also connected to ground. However, it is alternatively possible to connect the capacitance C1 to the side of the power supply source Vs which is not connected to ground.

The energy converter further comprises a capacitance C2' which is arranged parallel to the load Zload' on the secondary side of the transformer 2. The load Zload' may be a device which operates at an alternating voltage. This device may in turn be, for example, a rectifier for obtaining a DC voltage.

The energy converter further comprises a capacitance Chb which is arranged in such a way that it smoothes the value of a change of the voltage at the node K per unit of time. In this embodiment, the capacitance Chb is arranged between the node K and ground. However, the capacitance Chb may be alternatively arranged between the node K and the side of the power supply source Cs which is not connected to ground. Alternatively, the capacitance Chb may in principle consist of a parasitic capacitance of elements of the energy converter.

The energy converter is further provided with a control device Cnt for controlling the first and the second switch Sh, SI via leads 12 and 13, respectively. The control device Cnt thus defines the instants when the first and second switches Sh and Sl are opened and closed. In this embodiment, an input of the control device is connected to the node K via a lead l1.

When the capacitance C2' and the load Zload' are transformed in known manner to the primary side of the transformer T, an equivalent circuit diagram of the energy converter of FIG. 1 is obtained, as is shown in FIG. 2. The coil L2 replaces the transformer T, the capacitance C2 replaces the capacitance C2', and Zload replaces the load Zload'.

FIG. 2 shows some currents and voltages which will be elucidated hereinafter. The voltage Vhb at the node K is a square wave during normal use. For computing the transfer characteristics, a first harmonic approximation may be used, in which only the fundamental frequency is considered. The higher harmonics can be ignored because the frequencies of these components are far apart from the resonance frequency of the energy converter. Moreover, it holds that the contribution of these higher harmonics to the output (Zload) is negligible.

If the capacitor C1 has a sufficient value, it may also be ignored. If Zload has an infinitely large impedance, it holds for the resonance frequency:

$$Wp = \frac{1}{\sqrt{Lp \cdot C2}}$$

In this case, Lp is a parallel arrangement of the coils L1 and L2:

$$Lp = \frac{L1 \cdot L2}{L1 + L2}$$

In practice, Zload will, however, be a finite impedance, which results in a shift of the resonance frequency.

FIG. 3*a* shows the waveforms when the energy converter operates in the inductive mode. Here, Hs gate is the switching signal which is applied to the first switch Sh. When this switching signal is high, the switch Sh is closed, i.e. conducting. The signal Hs gate is applied by the control device Cnt to this switch. The signal Ls gate is the control signal which is applied by the control device Cnt to the second switch S1. It appears therefrom that both switches will never be closed simultaneously. If this were the case, there would be a short circuit. The significance of the other signals is directly apparent from FIG. 3*a*. In the inductive mode, the phase of the current Iid trails the (fundamental harmonic of the) voltage Vhb of the half-bridge circuit, i.e. the voltage at the node K in this embodiment. The fundamental harmonic of the voltage Vhb is denoted by a broken line in the Iind diagram. After the conducting switch (for example, the first switch Sh) is opened at the instant t0, the current Iind will charge the capacitor Chb. After subsequently the body diode (d2) of the other switch (this is the switch which has not just been opened) starts conducting, this other switch Sl can be closed at the instant t1. Then there is no noticeable voltage across this switch. In that case, there are no switching losses. The interval t0–t1 in which both switches are opened is referred to in this case as the non-overlap time. This phenomenon is repeated with inverted voltages and currents when the switch Sl is opened at instant t2 and the switch Sh is closed at instant t3, while the body diode d1 conducts current. The non-overlap time is the interval t2–t3.

FIG. 3*a* shows by means of Hs/Ls Fet and Ls diode that, if Iind is larger than 0, the current Iind flows through the switch Sh, the switch Sl or the diode d2 arranged anti-parallel to the switch Sl. Similarly, Hs/Ls Fet and Hs diode indicate that, when the current Iind is smaller than 0, this current flows through the switch Sh, the switch Sl or the diode d1 arranged anti-parallel to the switch Sh.

FIG. 3*b* shows the diagrams of FIG. 3*a* when the switching frequency of the energy converter is decreased to a point at which the current Iind is almost in phase with the (fundamental harmonic of) the voltage Vhb, but is still inductive. After the conducting switch Sh or Sl is opened, the current Iind will start charging the capacitance Chb, but before the diode (d1 or d2) of the other switch starts conducting, the direction of the current Iind is reversed. At the instant when the direction of the current Iind is reversed, the slope of Vhb is equal to 0. As is clearly apparent from FIG. 3*b*, the voltage Vhb at the node K is smaller at the instant t1 than the power supply voltage Vs applied to the switch Sh. In other words, there is a voltage across the switch Sh. When the switch Sh is subsequently closed at the instant t1 (Hs gate becomes high), hard-switching takes place at which switching losses occur. The voltage across the switch Sh disappears within a fraction of a second, and the voltage at the node K and the voltage Vhb jump to the value of the power supply voltage of the power supply Vs. This results in a short lasting current peak of Ichb after the instant t1, as is shown in FIG. 3*b*. This phenomenon is repeated when the switch Sh is opened at the instant t2 and when subsequently the switch Sl is closed at the instant t3 after the non-overlap time t3–t2 has elapsed. Hard-switching also takes place when the switch Sl is closed. The mode described with FIG. 3*b* is referred to as the near-capacitive mode.

In the diagrams shown in FIG. 3*c*, the frequency of the energy converter is decreased to a point at which the current Iind is in phase with the (fundamental harmonic of) the half-bridge voltage Vhb or even leads the half-bridge voltage in phase. In that case, the capacitor Chb is not charged at all. This is apparent from FIG. 3*c* in which the voltage Vhb remains equal to 0 between the instants t0 and t1. When the switch Sh is therefore closed at the instant t1, there is a voltage difference across this switch which is equal to the power supply voltage Vo. When the switch Sh is closed, hard-switching thus again takes place and switching losses occur.

The desired mode in which the energy converter is active is the mode in accordance with FIG. 3*a*, in which the current Iind is inductive and switching losses are minimal. For a satisfactory operation, the non-overlap time (t0–t1 and t2–t3) must be chosen to be sufficiently long to prevent hard-switching as a result of the finite rise time and decay time of the voltage Vhb. In fact, as is shown in FIG. 3*a*, the voltage Vhb rapidly increases between t0 and t1 but in this case it takes approximately (t1–t1)/2 sec before Vhb has reached its maximum value. On the other hand, there is also a maximum to which the non-overlap time is bound because the other switch Sl must be closed before the current Iind reverses its direction again. If this is not the case, hard-switching also takes place.

In existing systems, there are two ways of determining the overlap time. First, use is made of a fixed non-overlap time. This is a simple method in which the opposite switch is closed after a fixed delay time has elapsed and after the conducting switch was opened. However, it is also known to implement the non-overlap time in an adjustable way. The instant of switching of the switch SI is determined by the instant when the current through the capacitance Chb passes a small positive value when the value of the current decreases towards 0. This positive value Idet is shown in FIG. 4*b*1. In FIG. 4*b*1, the energy converter operates in the inductive mode, i.e. the mode in accordance with FIG. 3*a*. At the instant t0, the switch Sl is opened in this embodiment. The switch Sh had already been opened. At t0, the voltage Vhb starts to increase. The current Ichb starts to decrease towards 0, also from the instant t0. When the current Ichb becomes equal to Idet at the instant t4, the instant is determined which in its turn triggers the instant when the non-overlap time can end, i.e. when the switch Sh can be closed. (At a negative slope of Vhb, all polarities are reversed and the instant when the switch SI can be closed is determined in the same way.) A comparator is often used for determining the instant when Ichb is equal to Idet. However, this comparator has a reaction time resulting in said other switch Sh being closed some time after the instant t4, in this example at the instant t1. However, the delay may be so large that the current direction of Ichb has meanwhile been reversed. This means that the voltage Vhb already starts to decrease so that a substantial voltage is present across the switch Sh when this switch is closed. Then, hard-switching takes place again. This is shown in FIG. 4*b*2.

According to the invention, this problem is alleviated by adapting the control device Cnt to determine a reached maximum value of a given quantity, in this example the current Ichb, in which subsequently a threshold value is determined on the basis of this determined maximum value. Particularly, the threshold value in this embodiment is chosen to be equal to the factor K times the maximum value Ichb, in which K has a value between 0 and 1. The control device is then provided with means for comparing a value of a quantity which relates or is equal to the change of the voltage per unit of time at the node K, on the one hand, (in this example the current Ichb, or dVhb/dt) with the threshold value, on the other hand, for determining the switching instants. In this embodiment, at least the switching instants when the switches Sh and Sl are closed are thus determined. The instant when the switches are opened may be determined in known manner.

To this end, the control device is provided with a peak current detector P1 which is connected to the node K via a capacitance Cs. The output of the peak detector P1 is connected to a comparator Comp1 via two series-arranged multipliers Ml and M2. Moreover, the comparator Comp1 is connected to the node K via a multiplier M3 and via the capacitance Cs. The output of the comparator Comp1 is connected to a processor P2, which processor P2 is connected to the switch Sh via the lead 12 and to the switch Sl via the lead 13.

It holds that the current Ics is equal to Cs×dVhb/dt. Furthermore, it can easily be ascertained that, during the period when Vhb changes (the periods between t0 and t4 and t2 and t5), it holds that $$Ics = Iind \times \frac{Cs}{Cs + Chb}$$

The control device Cnt operates as follows.

The peak detector P1 determines the maximum value of the current Ics. The maximum value of the current Ics is also a measure of the maximum value of the current Iind. This maximum value is also a measure of the maximum slope of Vhb (Vhb/dt max). This means that it is a measure of a quantity which relates to a maximum value of the change of the voltage per unit of time at the node K between the first and the second switch. The quantity which relates to the value of the change of the voltage Vhb per unit of time is thus the current Ics in this embodiment. The peak detector determines the maximum value of this current Ics. This value Ics max is multiplied by the multiplier M1 by a value K, in which K may assume a value of between 0 and 1. The multiplier M2 multiplies the output signal of the multiplier M1 by a factor C. In this example, this factor C is chosen to be 1. The value K×Ics max functions as a threshold value in this example. The multiplier M3 multiplies the value of Ics also by a factor C. In this example, the factor C is chosen to be equal to 1, as stated hereinbefore, so that the comparator 1 compares the value of Ics with the threshold value mentioned hereinbefore.

In the inductive mode, the current Iind will not become equal to 0 in the time interval in which Vhb changes, i.e. in the time interval t0–t4 and in the time interval t2–t5. At the end of the slope dVhb/dt, for example, at the instant t4 (until the instant t0), the current Ics will decrease to 0 (and this also applies to the current Ichb) and Iind will subsequently flow through the diode d1, with the result that dVhb/dt becomes equal to 0. This is shown in FIG. 6*a*. At the instant t6 when Ics decreases to 0 and passes the threshold value K×Ics max, the comparator Comp1 will control the processor P2 in response thereto. In response thereto, the processor P2 will close the switch Sh via lead 12. This takes place at the instant t1 which is delayed some time with respect to the instant t6. This delay time ΔT=t6–t1 is not critical as long as the current Iind is not yet equal to 0. Since a delay time ΔT is now necessary, it is no longer a drawback that the comparator Comp1 itself also causes a delay time ΔT. This delay time may be incorporated in the delay time ΔT. According to the invention, it is therefore ensured that the instant t6 occurs before the instant t4 when the slope of Vhb becomes equal to 0. In how far the instant t6 occurs at an earlier instant than the instant t4 can be determined by adjusting the factor K. If the factor K becomes smaller, t6 will occur at a later instant (and hence also t1), and if K becomes larger, t6 will occur at an earlier instant (and hence also t1) if it is assumed that ΔT is chosen to be a fixed value. In accordance with a practical variant, the delay of the comparator Comp1 itself is taken as a value for ΔT. The processor P2 then does not have any influence on ΔT. The processor P2 may of course also be adapted in such a way that ΔT is the sum of the inherent delay ΔT of the comparator Comp1 plus an adjusted delay of the processor P2.

When the energy converter operates in the near-capacitive mode, the control device shown in FIG. 5 has another great advantage. This will be described with reference to FIG. 6*b*. In the near-capacitive mode, the current Iind will decrease during the period t0–t4 in which Vhb has a slope. The instant t6 when Ics has become equal to the threshold value K×Ics max is before the instant t4. This instant t6 is determined by the factor K. If K becomes larger, t6 will occur at an earlier instant. When K decreases, t6 will occur at a later instant. The factor K can now be chosen to be such that the switching instant t1 (for which it holds that t1=t6+ΔT) coincides with the instant t4. In other words, the factor K can be chosen to be such that t1=t4. This means that, in this example, the switch Sh is closed at the instant when the voltage Vhb is maximal. This means that the switch Sh is closed at the instant when the voltage across this switch is minimal. In other words, the switch Sh is closed at the instant when the current Ics is equal to 0. The switching losses will thereby be minimized. It is ensured in a completely analog way that the switch Sl is closed at an instant t3 for which the voltage Vhb again reaches an extreme value. At this instant, it therefore holds again that the current Ics and Iind is equal to 0 and that a minimal voltage is present across the switch Sl because the voltage at the node K has reached an extreme value which is as close as possible to the voltage supplied by the voltage source Vs to the switch Sl (in this example, this voltage level is equal to ground). All voltages, currents and threshold values are inverted with respect to the situation discussed hereinbefore for determining the instant when the switch Sh is closed. The instants when the switches Sh and Sl are opened are determined in known manner by the processor P2.

The invention is by no means limited to the embodiments described hereinbefore. For example, factor C may assume values different from 1. Particularly, the factor C is chosen to be equal to 1/K. In that case, the maximum value of Ics is taken as the threshold value and this threshold value is compared with a quantity which corresponds to Ics/K. The invention is described with reference to a half bridge. The switching instants may, however, be determined in an entirely analog way for a full-bridge circuit having four switches. In that case, the switches are arranged pair-wise equal. It is also feasible in this case that the peak detector P1 and the multiplier M3 are connected to the node K, each with a separate capacitor Cs and Cs', respectively. Such variants are considered to be within the scope of the invention.

What is claimed is:

1. An energy converter for supplying electric energy from an energy source to a load, the energy converter comprising:

a transformer having a primary side and a secondary side, the secondary side being adapted to be connected, in operation, to the load, at least a first and a second series-arranged, controllable switch to be connected, in operation, to the energy source, diodes arranged anti-parallel to the first and the second switch, and a control device for generating control signals with which the first and the second switch are opened and closed for generating an alternating current in the primary side of the transformer, the control device comprising means for comparing a threshold value with the value of a quantity which is related or equal to a change of the voltage per unit of time at a node of the first switch and the second switch for determining switching instants of the first and the second switch, wherein, the control device being adapted to determine a maximum value of said quantity and to determine the threshold value on the basis of the determined maximum value of the quantity.

2. An energy converter as claimed in claim 1, characterized in that the threshold value is equal to a factor K times the maximum value, in which K has a value of between 0 and 1.

3. An energy converter as claimed in claim 2, characterized in that the factor K is determined in such a way that one of the switching instants coincides with the instant when the voltage of the node assumes an extreme value when the frequency of the alternating current through the primary side of the transformer is so low that this alternating current is at least substantially in phase with the voltage at the node.

4. An energy converter as claimed in claim 1, characterized in that the energy converter further comprises at least a capacitance for limiting the value of a change of the voltage at the node per unit of time, the value of said magnitude relating to the value of the current through the capacitance.

5. An energy converter as claimed in claim 3, characterized in that the factor K is determined in such a way that one of the switching instants coincides with the instant when the current through the capacitance becomes zero, while the value of the current preceding said instant decreases to zero when the frequency of the alternating current through the primary side of the transformer is so low that this alternating current is at least substantially in phase with the voltage at the node.

6. An energy converter as claimed claim 1, characterized in that the control device comprises a current peak detector which is connected via a first measuring capacitance to the node for determining said maximum value.

7. An energy converter as claimed in claim 6, characterized in that the control device further comprises a multiplier which is connected to an output of the peak detector for multiplying the maximum value by the factor K, a second measuring capacitance and a comparator which is connected to an output of the multiplier and is connected to the node via the second measuring capacitance, the comparator being adapted to determine the instant when an output signal of the peak detector is equal to an output signal of the comparator.

8. An energy converter as claimed in claim 7, characterized in that the first and the second capacitance are formed by at least one and the same capacitance.

9. An energy converter as claimed in claim 1, characterized in that the node of the first and the second switch is connected to the primary side of the transformer.

10. An energy converter as claimed in claim 1, characterized in that the switching instants are at least the switching instants when the switches are closed.

* * * * *

UNITED STATES PATENT AND TRADEMARK OFFICE

CERTIFICATE OF CORRECTION

PATENT NO. : 6,496,387 B2
DATED : December 17, 2002
INVENTOR(S) : Johan Christiaan Halberstadt It is certified that error appears in the above-identified patent and that said Letters Patent is hereby corrected as shown below:

Title page,
Item [73], Assignee, change "Phillips" to -- Philips --.

Signed and Sealed this

Twenty-fifth Day of March, 2003

JAMES E. ROGAN
*Director of the United States Patent and Trademark Office*